United States Patent
Katakol et al.

(10) Patent No.: US 12,271,996 B2
(45) Date of Patent: Apr. 8, 2025

(54) IMAGE LIGHTING TRANSFER

(71) Applicant: ADOBE INC., San Jose, CA (US)

(72) Inventors: Sudeep Siddheshwar Katakol, Ann Arbor, MI (US); Taesung Park, San Francisco, CA (US); Aliakbar Darabi, Newcastle, WA (US); Kevin Duarte, San Jose, CA (US); Ryan Joe Murdock, American Fork, UT (US)

(73) Assignee: ADOBE INC, San Jose, CA (US)

( * ) Notice: Subject to any disclaimer, the term of this patent is extended or adjusted under 35 U.S.C. 154(b) by 265 days.

(21) Appl. No.: 18/166,189

(22) Filed: Feb. 8, 2023

(65) Prior Publication Data

US 2024/0265625 A1    Aug. 8, 2024

(51) Int. Cl.
*G06T 15/50* (2011.01)
*G06T 11/60* (2006.01)

(52) U.S. Cl.
CPC .......... *G06T 15/506* (2013.01); *G06T 11/60* (2013.01)

(58) Field of Classification Search
CPC .............................. G06T 15/506; G06T 11/60
See application file for complete search history.

(56) References Cited

U.S. PATENT DOCUMENTS

| | | | |
|---|---|---|---|
| 2019/0228273 A1* | 7/2019 | Merrill | G06T 11/60 |
| 2020/0184605 A1* | 6/2020 | Vogels | G06V 10/7747 |
| 2020/0265219 A1* | 8/2020 | Liu | G06F 18/214 |
| 2021/0012090 A1* | 1/2021 | Savchenkov | G06Q 30/0254 |
| 2021/0150354 A1* | 5/2021 | Karras | G06N 3/088 |
| 2021/0350504 A1* | 11/2021 | Shen | G06T 5/60 |
| 2022/0301227 A1* | 9/2022 | Kanazawa | G06T 11/001 |
| 2023/0342893 A1 | 10/2023 | Hinz et al. | |

OTHER PUBLICATIONS

Mishra, Sarthak, "Face editing with GAN—A Review", Computer Vision and Pattern Recognition, Arxiv, Jul. 2022, pp. 1-7 (Year: 2022).*
Xu, Yinghao. "GH-Feat: Learning Versatile Generative Hierarchical Features From GANs," in IEEE Transactions on Pattern Analysis and Machine Intelligence, Dec. 2022, vol. 45, No. 6, pp. 7395-7411 (Year: 2022).*
ClipDrop—Relight; https://clipdrop.co/relight—Sep. 1, 2022.
Hao Zhou et al.; Deep Single-Image Portrait Relighting, ICCV paper is the Open Access version, provided by the Computer Vision Foundation, Oct. 1, 2019.

(Continued)

*Primary Examiner* — Terrell M Robinson
(74) *Attorney, Agent, or Firm* — F. Chau & Associates, LLC

(57) ABSTRACT

A method for training a GAN to transfer lighting from a reference image to a source image includes: receiving the source image and the reference image; generating a lighting vector from the reference image; applying features of the source image and the lighting vector to a generative network of the GAN to create a generated image; applying features of the reference image and the lighting vector to a discriminative network of the GAN to update weights of the discriminative network; and applying features of the generated image and the lighting vector to the discriminative network to update weights of the generative network.

20 Claims, 12 Drawing Sheets

---

Receive Source image and Reference image from user interface (S901)

↓

Determine Reference Lighting from the Reference Image (S902)

↓

Apply Reference lighting to attribute mapping network of a Generative Network (S903)

↓

Apply Source image to encoder of Generative Network (S904)

↓

Create Generated image from output of Generative Network (S905)

(56) References Cited

OTHER PUBLICATIONS

Tero Karras, et al., "Analyzing and Improving the Image Quality of StyleGAN", CVPR 2020 paper is the open version, provided by the Computer Vision Foundation; the final version of the proceedings is available on IEEE Xplore.
Search Report dated Jun. 4, 2024 in corresponding United Kingdom Patent Application No. 2318623.2.
Weihong Xu, et al., "RelightGAN: Instance-level Generative Adversarial Network for Face Illumination Transfer", IEEE Transactions on Image Processing, vol. 30, 2021, pp. 3450-3460.

* cited by examiner

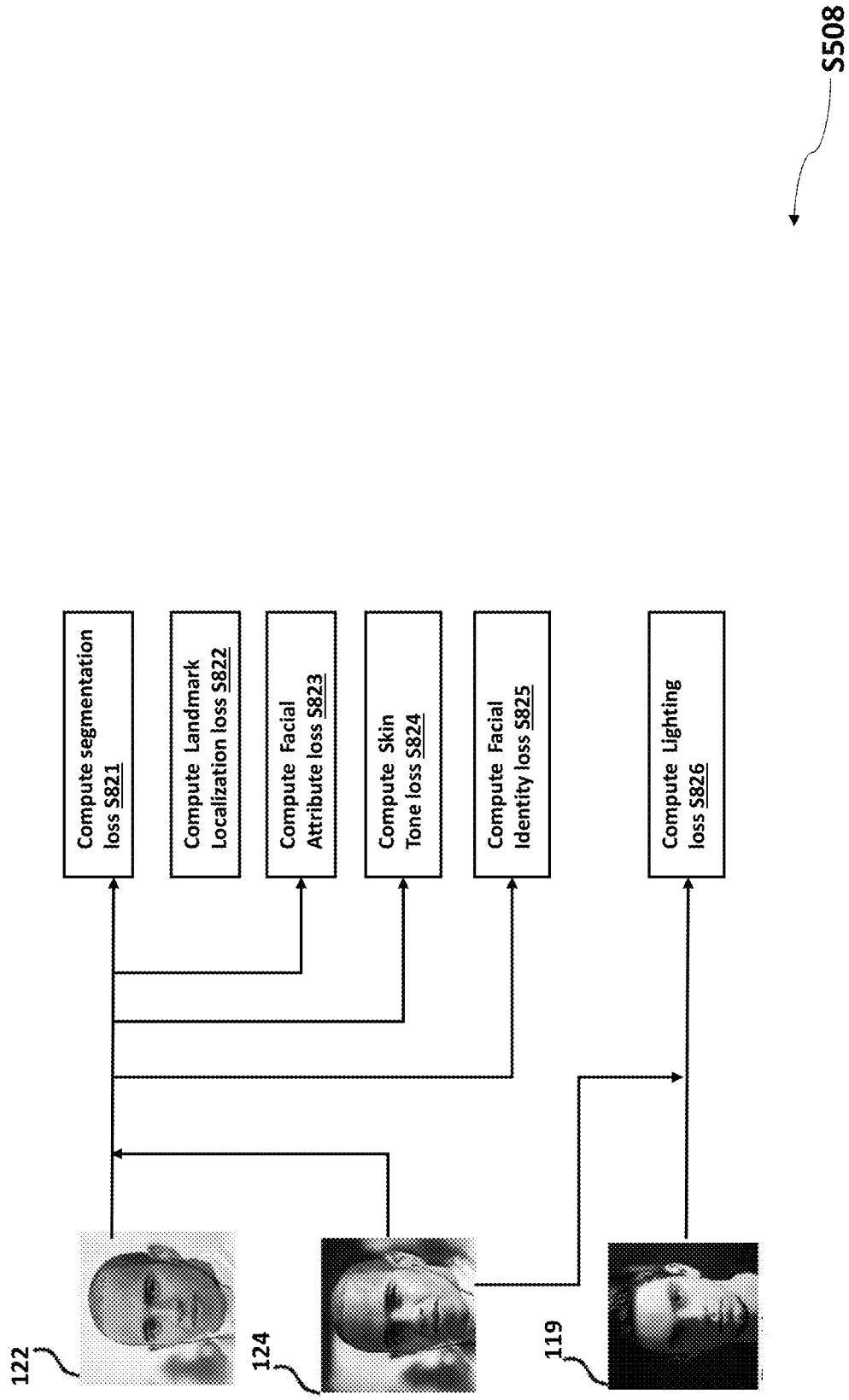

IMAGE LIGHTING TRANSFER

1. TECHNICAL FIELD

The following relates generally to transfer of lighting of a reference image to a source image, and more specifically to methods and systems for transferring the lighting of the reference image to the source image using a generative adversarial network (GAN).

2. BACKGROUND

In portrait lighting transfer, given a reference image and a source image, the goal is to edit the source image such that it has the same lighting conditions as that of the reference image while preserving the identity of the human face in the source image. However, it is difficult to accomplish this goal because the solution needs to have some understanding of the physics of lighting to adjust the brightness on specific regions of the face. Further, it is difficult to recognize and create realistic shadows. Moreover, it is difficult to reliably estimate the lighting conditions from a single image.

A prior technique uses a GAN model to relight an image. However, the GAN model is not able to produce realistic images under drastically different lighting conditions. Further, since the prior GAN model uses an unconditional discriminator, it cannot simultaneously consider photorealism of the generated image and correctness of the lighting conditions.

Another prior technique relies on a face normal to perform relighting. However, this technique struggles to produce realistic shadows, and is unable to change the lighting on certain parts of a human face to match the lighting on the rest of the face.

Further, none of the prior image lighting transfer techniques support multi-colored lighting.

Thus, there is a need for a new technique for performing portrait lighting transfer that is capable of producing more realistic images while supporting multi-colored lighting.

SUMMARY

Systems, methods, and software are described herein for transferring lighting from a reference image to a source image. A generative network of a generative adversarial network (GAN) is trained to transfer the lighting of the reference image to the source image using a discriminative network of the GAN. The generative network may be a StyleGAN2 generative network and the discriminative network may be a conditional discriminative network. Noisy lighting conditions may be used while training the generative network to obtain better performance. Further, a technique is provided that uses the generative network to perform transfer of multi-colored lighting from the reference image to the source image.

In an exemplary embodiment of the disclosure, a method for training a generative adversarial network (GAN) to transfer lighting from a reference image to a source image includes: a user interface of an image editing apparatus receiving the source image and the reference image; a lighting estimator of the image editing apparatus generating a lighting vector from the reference image; the image generating apparatus applying features of the source image and the lighting vector to a generative network of the GAN to create a generated image; the image generating apparatus applying features of the reference image and the lighting vector to a discriminative network of the GAN to update weights of the discriminative network; and the image generating apparatus applying features of the generated image and the lighting vector to the discriminative network to update weights of the generative network.

In an exemplary embodiment of the disclosure, an image editing apparatus for transferring lighting from a first reference image to a first source image includes a memory and a processor. The memory stores a generative adversarial network (GAN) trained to transfer the lighting from the first reference image to the first source image. The processor is configured to receive the first source image and the first reference image, determine a first reference lighting vector from the first reference image, and apply features of the first source image and the first lighting vector to a generative network of the GAN to create a generated image having the lighting of the first reference image. The generative network is configured using an output provided by a discriminative network of the GAN previously trained using a second reference image, a second lighting vector determined from the second reference image, and a second source image.

In an exemplary embodiment of the disclosure, a method for transferring lighting from a first reference image to a first source image includes: a user interface of an image editing apparatus receiving the first source image and the first reference image; a lighting estimator of the image editing apparatus determining a first lighting vector of the reference image; the image editing apparatus configuring a generative network of a generative adversarial network (GAN) using an output provided by a discriminative network of the GAN previously trained using a using a second reference image, a second lighting vector determined from the second reference image, and a second source image; and the image editing apparatus applying features of the first source image and the first lighting vector to the generative network to create a generated image.

BRIEF DESCRIPTION OF THE DRAWINGS

The detailed description describes one or more embodiments with additional specificity and detail through use of the accompanying drawings, briefly described below.

FIG. 8 illustrates a method of compensating a parameter of the generative network according to an exemplary embodiment of the disclosure.

DETAILED DESCRIPTION

Figure 1:
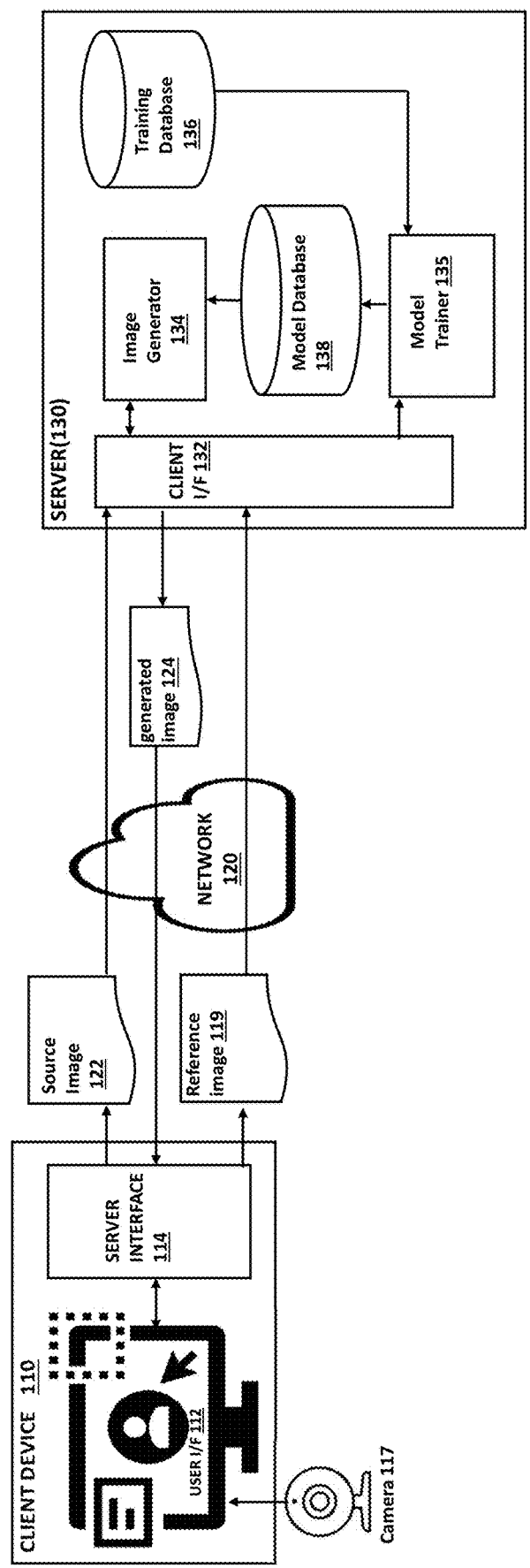
FIG. 1 illustrates a system for enabling a user to transfer lighting of a reference image to a source image.

The present disclosure relates to image processing, including generating and editing images using a machine learning model. In particular, embodiments of the disclosure provide systems and methods for transferring lighting from a reference image to a source image using a generative network of a GAN trained using a discriminative network of the GAN.

A GAN may be used for transferring lighting of a reference image to a source image of a human being to create a new image. However, the image generated by the GAN may lack realistic shadows and be unable to produce realistic images when lighting conditions change too drastically. Moreover, when the GAN uses an unconditional discriminator, some details of the human being in the source image may not be present in the new image. While a face normal may be considered when transferring lighting, shadows in the new image may not appear realistic and lighting on the hair and the ears of a human face may not match the lighting on the rest of the face. Further, the images produced by these techniques may be of lower quality than the original images.

An embodiment of the present disclosure transfers lighting from a reference image to a source image without losing details in a face of the source image by using a conditional discriminative network of a GAN to train a generative network of the GAN. For example, the GAN considers both the reference image and the generated image against lighting estimated from the reference image. The GAN may consider both the reference image and the generated image against the estimated lighting by performing a co-modulation on a face description vector of the face in the source image and a lighting description vector determined from the estimated lighting. Moreover, details of the face that would otherwise be lost may be retained by compensating weights of the generative network based on at least one of segmentation loss, landmark localization loss, facial attribute loss, skin tone loss, and facial identity loss calculated between the source image and the generated image and/or based on lighting loss calculated between lighting in the reference image and lighting in the generated image. Non-isotropic Gaussian noise may be added to the reference lighting used in the training of the GAN to increase a quality of an images generated by the generative network of the GAN. Further, an embodiment of the disclosure is capable of creating the generated image with multi-colored lighting from the reference image.

The following terms are used throughout the present disclosure:

The term "generative network" is a neural network that takes as input a simple random variable, and once trained, generates a random variable (i.e., generated data) that follows a targeted distribution.

The term "discriminative network" is a neural network that is fed the generated data and a stream of real data taken from the actual, ground truth data, and returns a probability indicating whether the generated data is deemed to be authentic data or fake data.

The term "generative adversarial network" abbreviated as GAN refers to a class of machine learning frameworks including the generative network that generates candidates and the discriminative network that evaluates the candidates.

The term "co-modulated GAN" abbreviated as CoMod-GAN refers to a generative adversarial network (GAN) that embeds conditional and stochastic style representations via co-modulation.

The term "lighting vector" refers to a set of numerical values that represents the lighting in an image, where each numerical value indicates a level of a different characteristic of the lighting.

Exemplary embodiments of the inventive concept are applicable to a client-server environment and a client-only environment. FIG. 1 shows an example of the client-server environment, where a user uses a graphical user interface 112 of a site client device 110 to transfer lighting of a reference image 119 to a source image 122. The transfer process results in the creation of a new image, which may be referred to as the generated image 124.

In an embodiment, the graphical user interface 112 presents a user with an option that enables the user to input or select the reference image 119 and the source image 122. The graphical user interface 112 may enable the user to use a camera 117 to capture the reference image 119 or the source image 122.

In an embodiment, the server interface 114 outputs the reference image 119 and the source image 122 across the computer network 120.

A client interface 132 of the server 130 forwards the received data (e.g., reference image 119 and the source image 122) to an image generator 134. The Image Generator 134 creates the generated image 124 from the received data using a generative network of a previously trained GAN (e.g., a model) retrieved from the model database 138. The GAN was previously trained by a Model Trainer 135 based on training data stored in the Training Database 136. The training of the GAN will be discussed in greater detail below.

According to an embodiment of the disclosure in a client-only environment, one or more of the Image Generator 134, the Model Trainer 135, the Model Database 138, and the Training Database 136 are present on the client device 110. For example, in certain embodiments, the client device 110 creates the generated image 124 locally without reliance on the server 130.

The computer network 120 may be wired, wireless, or both. The computer network 120 may include multiple networks, or a network of networks, but is shown in a simple form so as not to obscure aspects of the present disclosure. By way of example, the computer network 120 includes one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client device 110 includes one or more processors, and one or more computer-readable media. The computer-readable media may include computer-readable instructions executable by the one or more processors. The instructions may correspond to one or more applications, such as software to manage the graphical user interface 112, software to output the data (e.g., reference image 119 and the source image 122), and software to receive the generated image 124.

The server 130 includes a plurality of computing devices configured in a networked environment or includes a single computing device. Each server 130 computing device includes one or more processors, and one or more computer-readable media. The computer-readable media may include computer-readable instructions executable by the one or more processors. The instructions may correspond to one or more applications, such as software to interface with the client device 110 for receiving the data (e.g., the reference image 119 and the source image 122 when present) and outputting the generated image 124.

Figure 2:
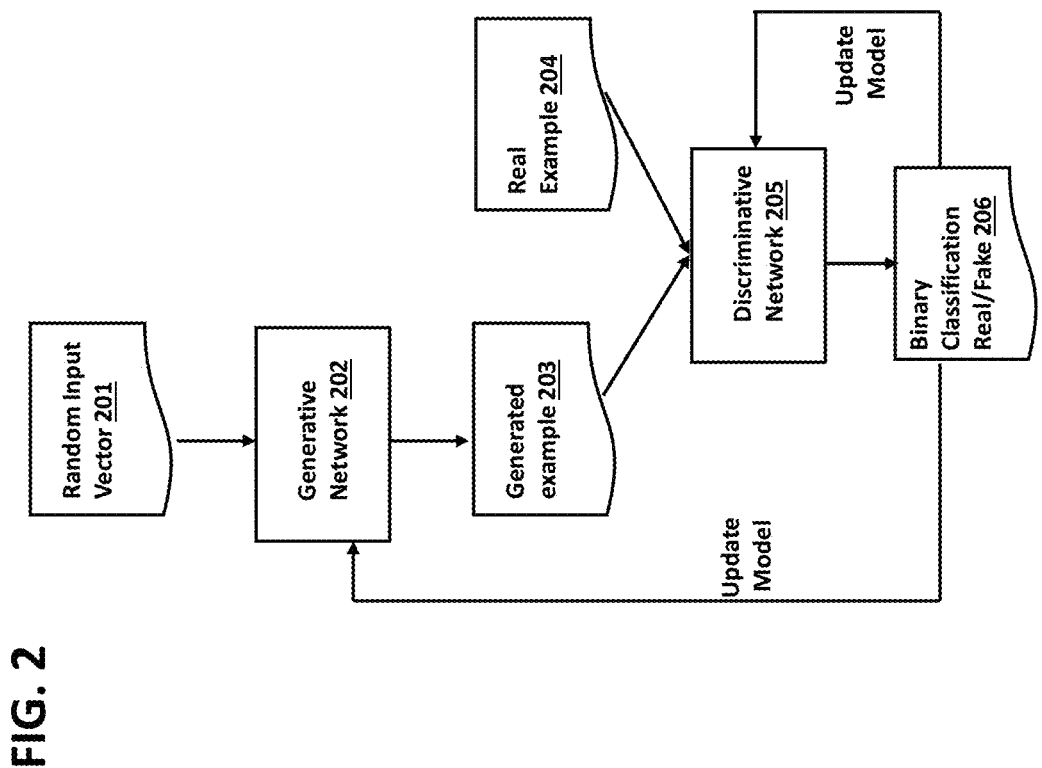
FIG. 2 illustrates a GAN according to an exemplary embodiment of the disclosure.

FIG. 2 illustrates a GAN 200. A generative network 202 of the GAN 200 takes a fixed-length random vector 201 from a latent space as input to generate a fake example 203. A discriminative network 205 of the GAN 200 operates on the fake example 203 and a real example 204 from a training dataset to predict a binary class label 206 indicating whether the fake example is real or fake. The discriminative network 205 is updated based on the predicted label 206 to get better at discriminating real examples from fake examples in the next round of training, and the generative network 202 is updated based on how well or poorly the generated fake example 203 fooled the discriminative network 205. In this way, the two models are competing against each other, they are adversarial in the game theory sense, and are playing a zero-sum game. When the discriminative network 205 successfully identifies real and fake generated examples, no change is needed to its model parameters, whereas the generative network 202 needs to make large updates to its model parameters. Alternately, when the generative network 202 fools the discriminative network 205, no change is made to model parameters of the generative network 202, but model parameters of the discriminative network 205 are updated.

Figure 3:
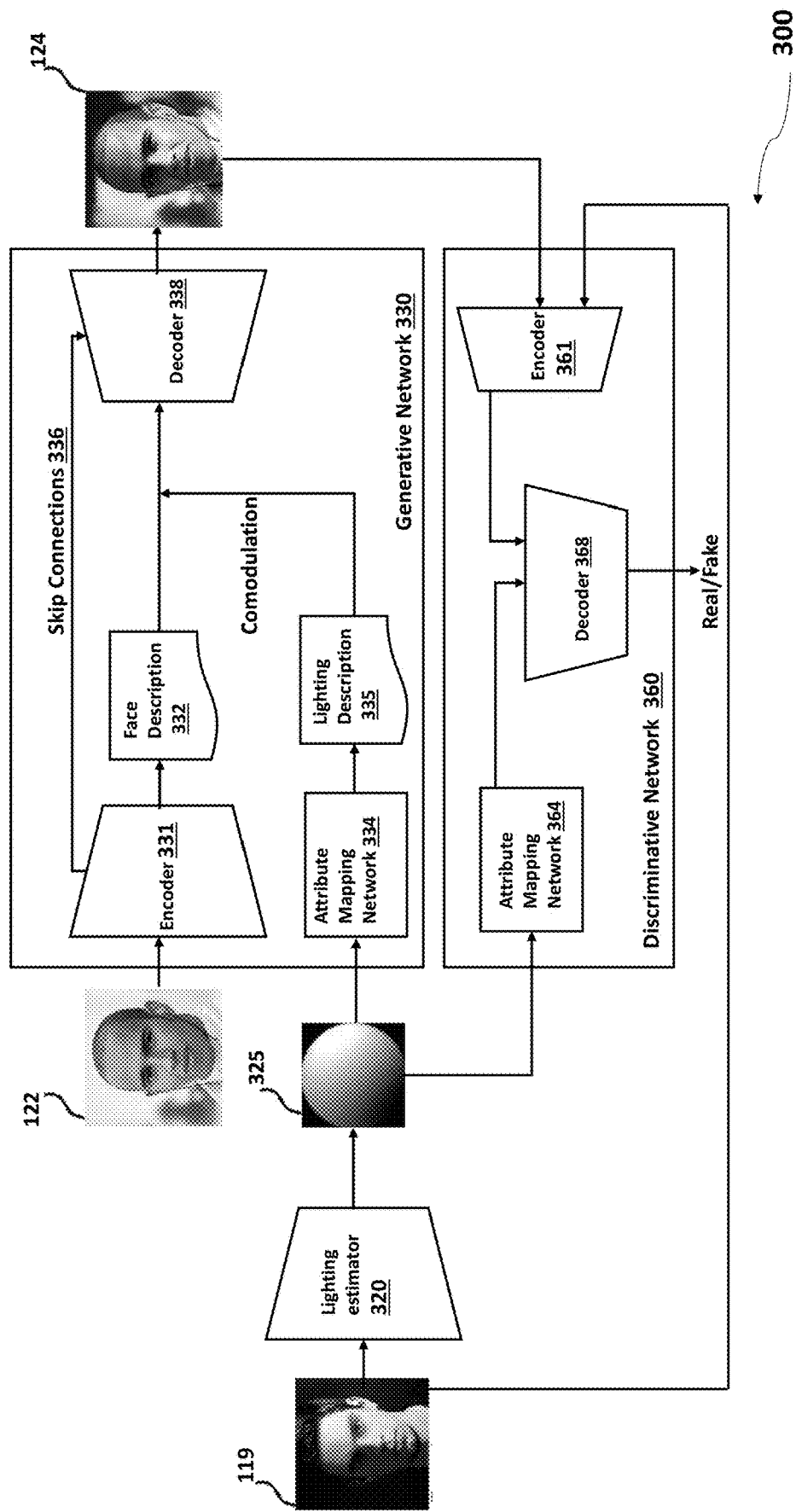
FIG. 3 illustrates a GAN for transferring lighting to a source image according to an exemplary embodiment of the disclosure.

FIG. 3 illustrates a GAN 300 according to an exemplary embodiment of the disclosure that may be used to transfer lighting from a reference image 119 to a source image 122 to create a generated image 124. The GAN 300 includes a generative network 330 (e.g., StyleGAN or StyleGAN2) and a discriminative network 360. In an embodiment, the GAN 300 is implemented based on a co-modulated GAN (Co-ModGAN) model. The discriminative network 360 is used to train the generative network 330, and once the generative network 330 is trained, only the trained generative network 330 is used to create the generated image 124. The generative network 330 operates on reference lighting 325 estimated from the reference image 119 and features of the source image 122.

A lighting estimator 320 may estimate the reference lighting 325 (e.g., a lighting vector) from features of the reference image 119. In an embodiment, the reference lighting 325 is 9-dimensional spherical harmonics.

The generative network 330 includes an Encoder 331, an Attribute Mapping Network 334, and a Decoder 338. The Encoder 331 operates on the source image 122 to generate a face description 332 (e.g., a numeral vector). The Attribute Mapping Network 334 operates on the reference lighting 325 to generate a lighting description 335 (e.g., a numeral vector). Skip connections 336 are present connecting the Encoder 331 and the Decoder 338, which provide skip data from the Encoder 331 to the Decoder 338. A co-modulation is performed in the generative network 330 using an output of the Encoder 331 and an output of the Attribute Mapping Network 334, and the Decoder 338 operates on a result of the co-modulation and the skip data received from the Skip connections 336 to create the generated image 124.

The discriminative network 360 includes an Encoder 361, an Attribute Mapping Network 364, and a Decoder 368. When the generated image 124 and the reference lighting 325 are used during training, the Encoder 361 receives the Generated image 124 and the reference image 119; and the Attribute Mapping Network 364 receives the reference lighting 325 to predict whether the generated image 124 is real or fake, and the prediction may be used to update parameters of the discriminative network 360 and parameters of the Generative network 330.

Figure 4:
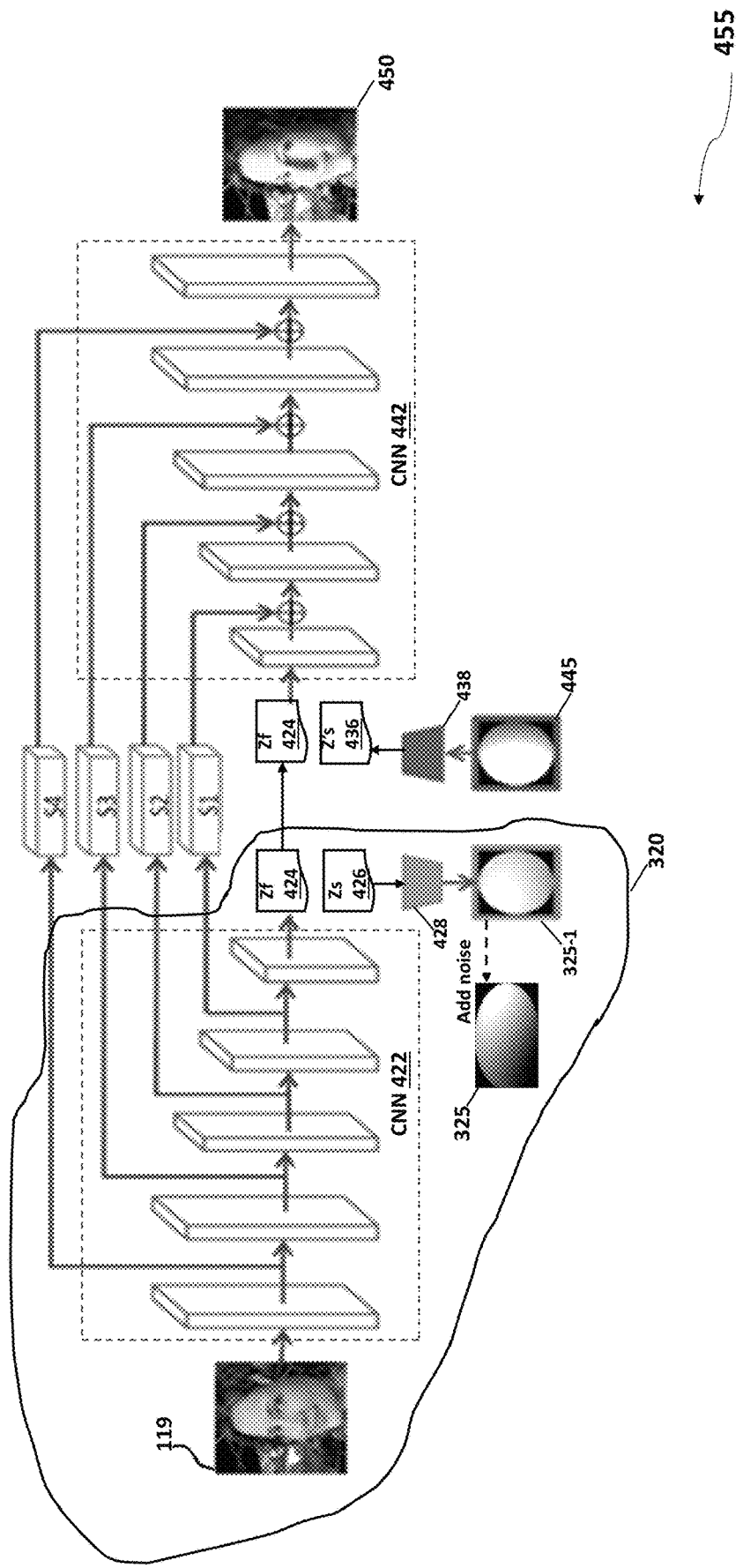
FIG. 4 illustrates a GAN for estimating a lighting vector according to an exemplary embodiment of the disclosure.

FIG. 4 illustrates the lighting estimator 320 according to an exemplary embodiment of the disclosure. The lighting estimator 320 is part of a GAN 455 that is usable to relight images using a method that differs from the GAN 300 of FIG. 3. The lighting estimator 320 includes a convolutional neural network (CNN) 422 that operates on the reference image 119 to generate facial features Zr and lighting features Zs and a multi-layer perceptron (MLP) 428 that operates on only the lighting features Zs to generate an initial lighting vector 325-1. For example, the MLP 428 may have three layers, but is not limited thereto. A MLP 438 outside the lighting estimator 320 operates on a reference lighting vector 445 to generate lighting features Z's, and a CNN 442 outside the lighting estimator 320 operates on the facial features Zr, the lighting features Z's and skip data received the CNN 322 to generate a re-lit image 450.

When the lighting estimator 320 is not used during training, the final lighting vector 325 is the same as the initial lighting vector 325-1. When the lighting estimator 320 is used during training, it may additionally add non-isotropic noise to the initial lighting vector 325-1 to generate the final lighting vector 325. The non-isotropic noise may be non-isotropic Gaussian noise. Adding the non-isotropic noise may help the model to generalize across unseen lighting conditions and help performance by making it harder for the model to overfit. Some of the 9 harmonic values in the 9-dimension spherical harmonics used to represent the initial lighting vector 325-1 may be more important than others. For example, the last five values of the 9 harmonic values may not be as accurate as the first four values of the 9 harmonic values. Accordingly, in an exemplary embodiment, when the non-isotropic noise is added, higher noise values are added to the last five values and lower noise values or 0 noise values are added to the first four values.

Figure 5:
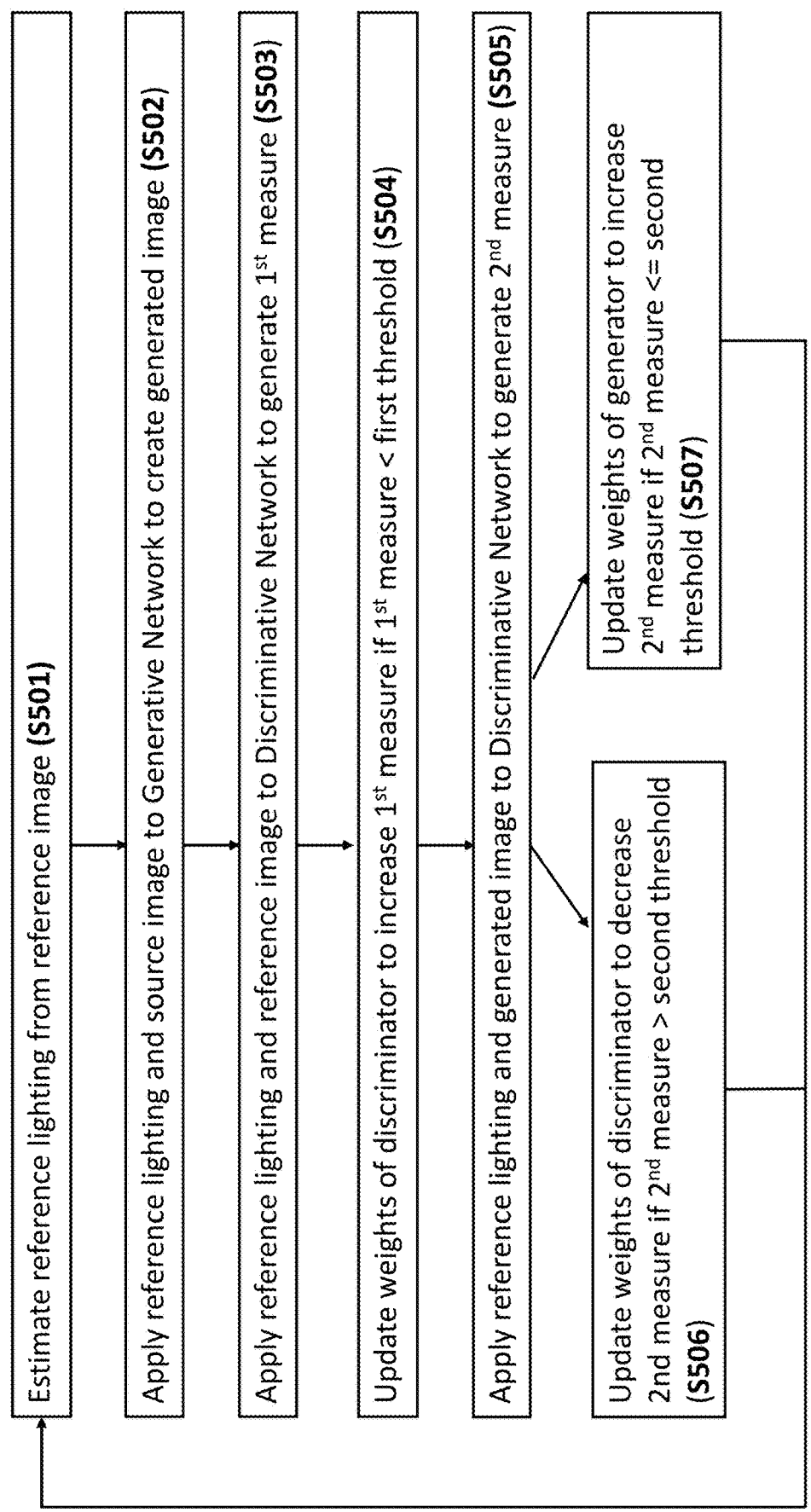
FIG. 5 illustrates a method of training a GAN to transfer lighting to a source image according to an exemplary embodiment of the disclosure.

FIG. 5 illustrates a method of training the GAN 300 according to an exemplary embodiment of the disclosure. The method of FIG. 5 is performed on a pair of images including a reference image and a target image, and may be repeated several times on different pairs of images until a user feels the model is sufficiently trained. FIG. 5 is discussed below in connection with the generative network 330 illustrated in FIG. 3.

The method of FIG. 5 includes estimating reference lighting from a reference image (S501). For example, referring to FIG. 3, the lighting estimator 320 may operate on the reference image 119 to generate the reference lighting 325.

The method FIG. 5 further includes applying the reference lighting and a source image to a generative network to create a generated image (S502). For example, the reference lighting 325 and the source image 122 may be applied to the generative network 330 of the GAN 300.

The reference lighting 325 is applied to an Attribute Mapping Network 334 of the generative network 330 to generate the lighting description 335. In an embodiment, the Attribute Mapping Network 334 is a deep residual network such as a ResNet. For example, the ResNet may include 8 linear layers. The ResNet may take a 9-dimensional spherical harmonic vector and produce a 512 dimensional vector.

The source image 122 is applied to the Encoder 331 of the generative network 330 to generate the face description 332. In an embodiment, the Encoder 331 is a CNN. First layers of the CNN may be used to perform down-sampling on the source image 122. For example, the first layers may perform N down-samplings to return a (4, 4, 512) dimension feature map, where N is at least 1. Second layers of the CNN after the first layers may performing a flattening operation. A linear layer may be disposed after the second layers. For example, the linear layer may obtain a 1024 dimensional vector, which is an embedding or a representation of an image.

The output of the Encoder 331 and the output of the Attribute Mapping Network 334 are concatenated to generate a combined vector, and the combined vector is used to modulate the layers of a Decoder 338 of the generative network 330 to create the generated image 124. Thus, the Decoder 338 can rely on information from the source image 122 or reference lighting 325 in the process of forming the re-lit image (e.g., the generated image 124). The Decoder 338 further uses skip data received from the skip connections 336 to create the generated image 124.

In an embodiment, the Decoder 338 includes a first layer to generate the combined vector from the face description 332 and the lighting description 335. The Decoder 338 may further include linear layers after the first layer that operate on the combined vector, and a reshaping operation may be performed on an output of the linear layers. For example, the linear layers and the reshaping operation may convert the 1024 dimensional combined vector to a (4, 4, 512) feature map. The Decoder 338 may further include a convolutional layer that up-samples the feature map. The Decoder 338 may further include modulation layer that performs a modulation operation on the output of the convolution layer and the combined vector. The Decoder 338 may further include a summing layer that adds an output of the modulation layer to skip data from one of the skip connections 336. Additional convolution, modulation, and summing layers may be present thereafter to consider the rest of the skip data from the remaining skip connections 336. In an embodiment, the modulation operation calculates a Gamma and Beta from the combined vector, calculates a product from multiplying Gamma by the output of the convolution layer, and returns a value by adding the product to Beta.

Figure 6:
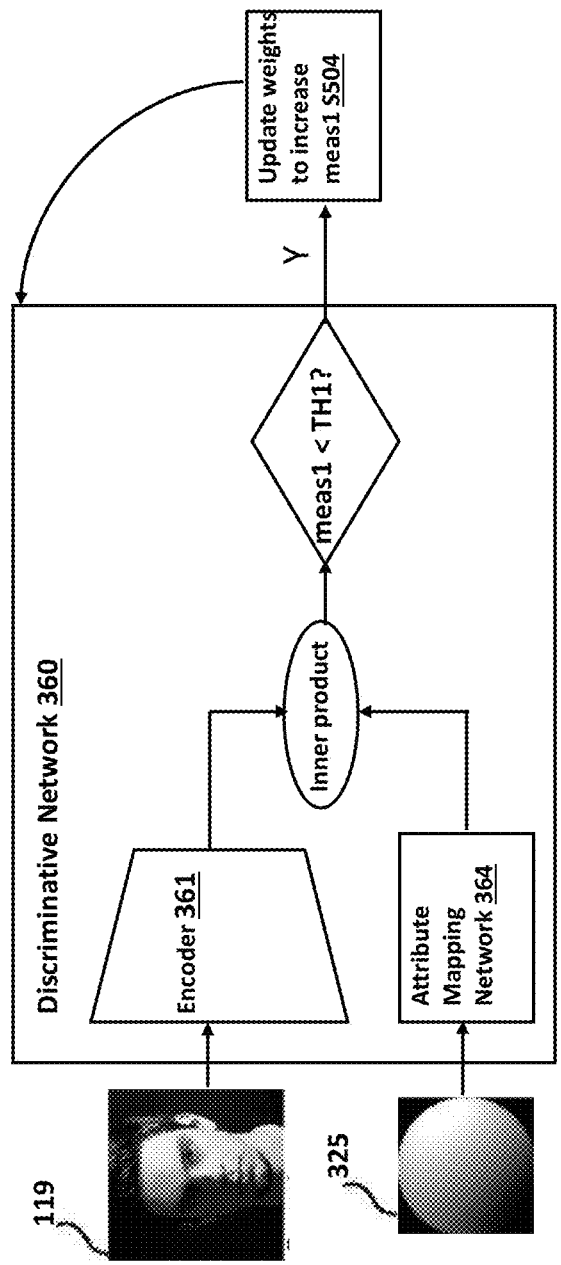
FIG. 6 illustrates training of a discriminative network of the GAN according to an exemplary embodiment of the disclosure.

The method FIG. 5 further includes applying the reference lighting and the reference image to the discriminative network to generate to generate a $1^{st}$ measure (s503). For example, as shown in FIG. 6, the reference lighting 325 may be applied to the Attribute Mapping Network 364 of the discriminative network 360 and the reference image 119 may be applied to the Encoder 361 of the discriminative network 360. An inner product may be calculated from an output of the Attribute Mapping Network 364 and an output of the Encoder 361 to generate the $1^{st}$ measure (see meas1 in FIG. 6).

The method of FIG. 5 further includes updating weights of the discriminative network to increase the $1^{st}$ measure if the $1^{st}$ measure is less than a first threshold (e.g., see TH1 in FIG. 6) (s504). When the $1^{st}$ measure is small or less than the first threshold, it means that the discriminative network 360 has concluded that the reference image 119 is a fake or is incompatible with the reference lighting 325. If the $1^{st}$ measure is large (e.g., equal or greater TH1), then the discriminative network 360 has concluded that the reference image 119 is real and thus the weights of the discriminative network 360 are not updated. The weights when the reference image 119 and the reference lighting 325 are input to the discriminative network 360, are proportional to a first Binary cross entropy (BCE) loss. The first BCE loss may be represented by Equation 1:

$$\text{Log}(1 + \exp(-meas1)) \qquad \text{[Equation 1]}$$

Figure 7:
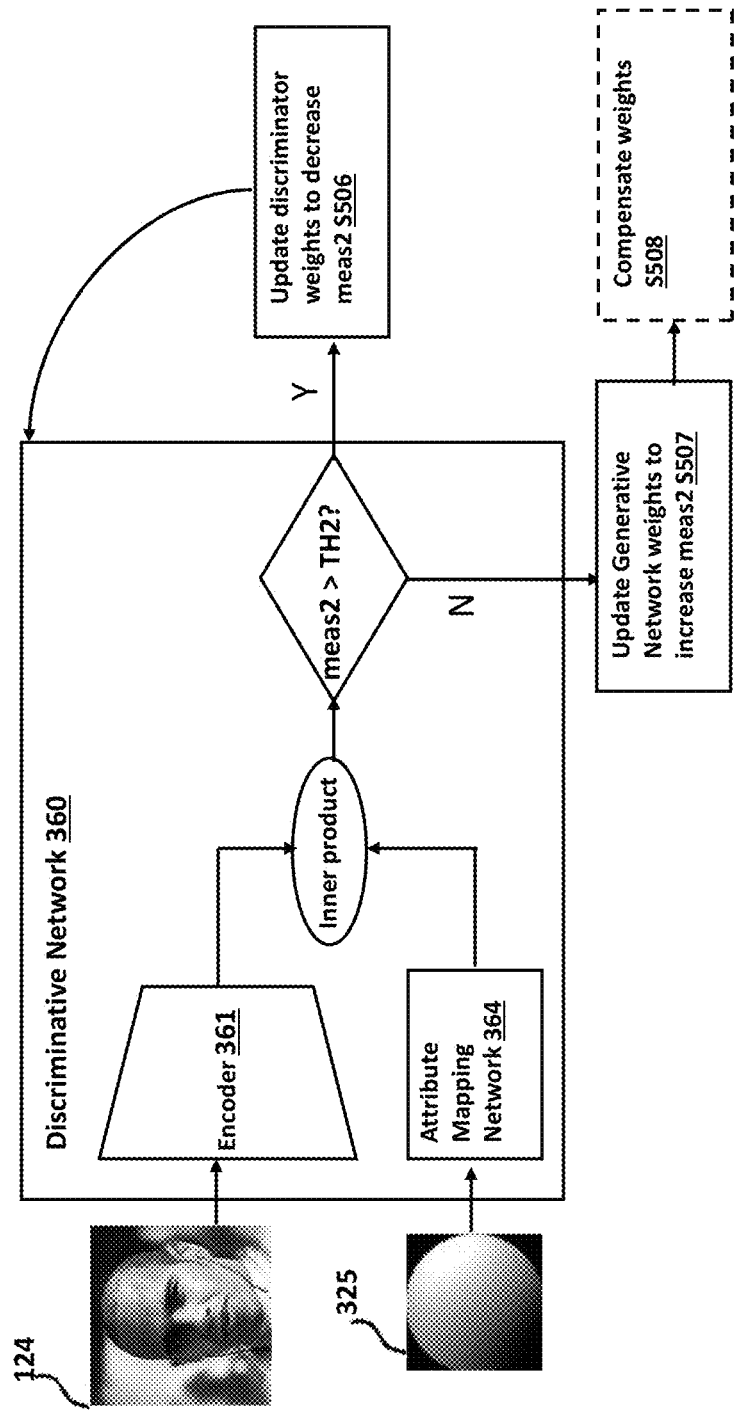
FIG. 7 illustrates training of the discriminative network and a generative network of the GAN according to an exemplary embodiment of the disclosure.

The method of FIG. 5 further includes applying the reference lighting and the generated image to the discriminative network to generate to generate a $2^{nd}$ measure (s505). For example, as shown in FIG. 7, the reference lighting 325 may be applied to the Attribute Mapping Network 364 of the discriminative network 360 and the generated image 124 may be applied to the Encoder 361 of the discriminative network 360. An inner product may be calculated from an output of the Attribute Mapping Network 364 and an output of the Encoder 361 to generate the $2^{nd}$ measure (see meas2 in FIG. 7).

The method of FIG. 5 further includes updating weights of the discriminative network to decrease the $2^{nd}$ measure if the $2^{nd}$ measure is greater than a second threshold (e.g., see TH2 in FIG. 7) (s506). When the generated image 124 and the reference lighting 325 are input to the discriminative network 360, one would expect the discriminative network 360 to conclude the generated image 124 is a fake and produce a very low $2^{nd}$ measure. However, if the $2^{nd}$ measure is large or greater than the second threshold, it means that the discriminative network 360 has concluded that the generated image 124 is real, and thus the weights are updated to decrease the $2^{nd}$ measure.

When the $2^{nd}$ measure is equal or less the second threshold (or low), the weights of the discriminative network 360 are not updated since it has concluded the generated image 124 to be a fake. Further, when the $2^{nd}$ measure is equal or less the second threshold, the weights of the generative network 330 are updated to increase the $2^{nd}$ measure since the generative network 330 was not able to fool the discriminative network 360 (s507). The weights of the generative network 330 when the generated image 124 and the reference lighting 325 are input to the discriminative network 360, are proportional to a second Binary cross entropy (BCE) loss. The second BCE loss may be represented by Equation 2.

$$\text{Log}(1 + \exp(-meas2)) \qquad \text{[Equation 2]}$$

However, a subsequent image generated by the generative network 330 after the update of its weights may suffer from various losses. The updated weights may be compensated based on differences/dissimilarity between the source image 122 and the generated image 124, or differences/dissimilarity between the generated image 124 and the reference image 119.

In particular, the generative network 330 may experience segmentation loss, landmark localization loss, facial attribute loss, skin tone loss, facial identity loss, or lighting loss after its weights have been updated.

Segmentation loss occurs when a segmentation generated from the source image 122 differs too greatly from the segmentation generated from the generated image 124. Landmark localization loss occurs when landmark points within the source image 122 are missing from the generated image 124. Facial attribute loss occurs when facial attributes (e.g., eyebrows, nose, eyes, etc.) within the source image 122 differ too greatly from the facial attributes within the generated image 124. Skin tone loss occurs when a skin tone of a person within the source image 122 differs too greatly from the skin tone of a person within the generated image 124. Facial identity loss occurs when a facial identity embedding of a person within the source image 122 differs too greatly from a facial identity embedding of a person within the generated image 124 such that it would prevent the person from being recognized. Lighting loss occurs when lighting of the reference image 119 differs too greatly from the lighting of the generated image 124. Accordingly, in an embodiment, the updated weights of the generative network 330 are compensated based on one or more of the above-described losses (s508).

FIG. 8 illustrates a method that may be used to compensate the weights of the generative network 330. The method of FIG. 8 includes performing one or more of computing a segmentation loss from the source image 122 and the generated image 124 (s821), computing a landmark localization loss from the source image 122 and the generated image 124 (s822), computing a facial attribute loss from the source image 122 and the generated image 124 (s823), computing a skin tone loss from the source image 122 and the generated image 124 (s824), computing a facial identity loss from the source image 122 and the generated image 124 (s825), and computing lighting loss from the generated image 124 and the reference image 119 (s826).

The segmentation loss may be computed by applying the source image 122 and the generated image 124 to a segmentation network such as DEEPLAB (e.g., version 3) that was trained to output a segmentation of the human face given a face portrait. Dissimilarity between the source image 122 and the generated image 124 in terms of segmentation may be determined by calculating a cross entropy loss from an output of the segmentation network.

The landmark localization loss may be computed by applying the source image 122 and the generated image 124 to a landmark localization network such as HR-NET. For example, the landmark localization network may be trained to output several (e.g., 68) landmarks on the human face given a face portrait as input to ensure the generated image 124 has the same landmarks as the source image 122. Dissimilarity between the source image 122 and the generated image 124 in terms of landmark localization may be determined by calculating an L1 loss from an output of the landmark localization network.

The facial attribute loss may be computed by applying the source image 122 and the generated image 124 to a facial attribute network such as HYDRAFACE that outputs several (e.g., 35) attributes of the human face (e.g., eyeglasses present or not, pose of the face, color of the hair etc.) given a face portrait as input to ensure the generated image 124 has the same facial attributes as the source image 122. Dissimilarity between the source image 122 and the generated image 124 in terms of facial attributes may be determined by calculating an L2 loss from an output of the facial attribute network.

The skin tone loss may be computed by applying the source image 122 and the generated image 124 to a skin tone estimation network such as FAIRFACE to ensure the generated image 124 has the same skin tone as the source image 122. Dissimilarity between the source image 122 and the generated image 124 in terms of skin tone may be determined by calculating a cross entropy from an output of the skin tone estimation network.

The facial identity loss may be computed by applying the source image 122 and the generated image 124 to a facial identity network such as FACENET that outputs an embedding of the human face which robustly captures the identity of the human to ensure that the generated image 124 has the same human subject as the source image 122. Dissimilarity between the source image 122 and the generated image 124 in terms of facial identity may be determined by calculating a cosine distance loss from an output of the facial identity network.

The lighting loss may be computed by applying the reference image 119 and the generated image 124 to a lighting network such as that shown in FIG. 4. For example, the reference lighting vector 445 may be generated from the generated image 124, and a dissimilarity between the reference image 119 and the generated image 124 in terms of lighting may be determined by calculating an L2 loss from an output of the lighting network.

Figure 9A:
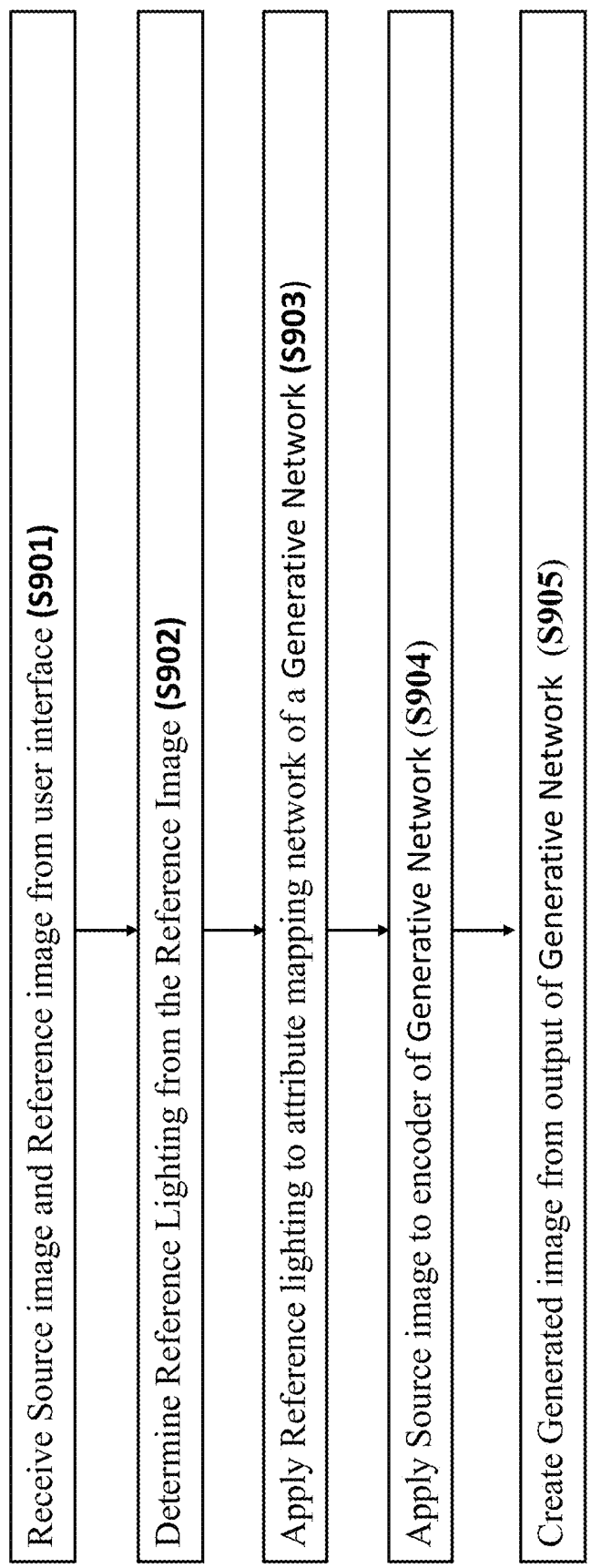
FIG. 9A illustrates a method of using the GAN to transfer lighting from a reference image to a source image according to an exemplary embodiment of the disclosure.

FIG. 9A illustrates a method transferring light from a reference image to a source image according to an exemplary embodiment of the disclosure.

The method of FIG. 9A includes receiving a reference image and a source image from a user interface (s901). For example, a user may use the user interface 112 to control the camera 117 to capture the reference image 119 and/or the source image 122 or use the user interface 112 to select the reference image 119 and/or the source image 122 from images stored on the server 130 or accessible to the server 130.

The method of FIG. 9A further includes determining reference lighting from the reference image (s902). For example, the reference image 119 may be applied to the lighting network 320 of FIG. 4 to generate the reference lighting 325.

The method of FIG. 9A further includes applying the reference lighting to an attribute mapping network of a generative network of a GAN (s903). For example, the reference lighting 325 may be applied to the Attribute Mapping Network 334 of the generative network 330 in FIG. 3.

The method of FIG. 9A further includes applying the source image to an encoder of the generative network (s904). For example, features of the source image 122 may be applied to the Encoder 331 of the generative network 330 in FIG. 3.

The method of FIG. 9A further includes creating a generated image from an output of the generative network (s905). For example, the generated image 124 may be created from an embedding output by the generative network 330 of FIG. 3.

Figure 9B:
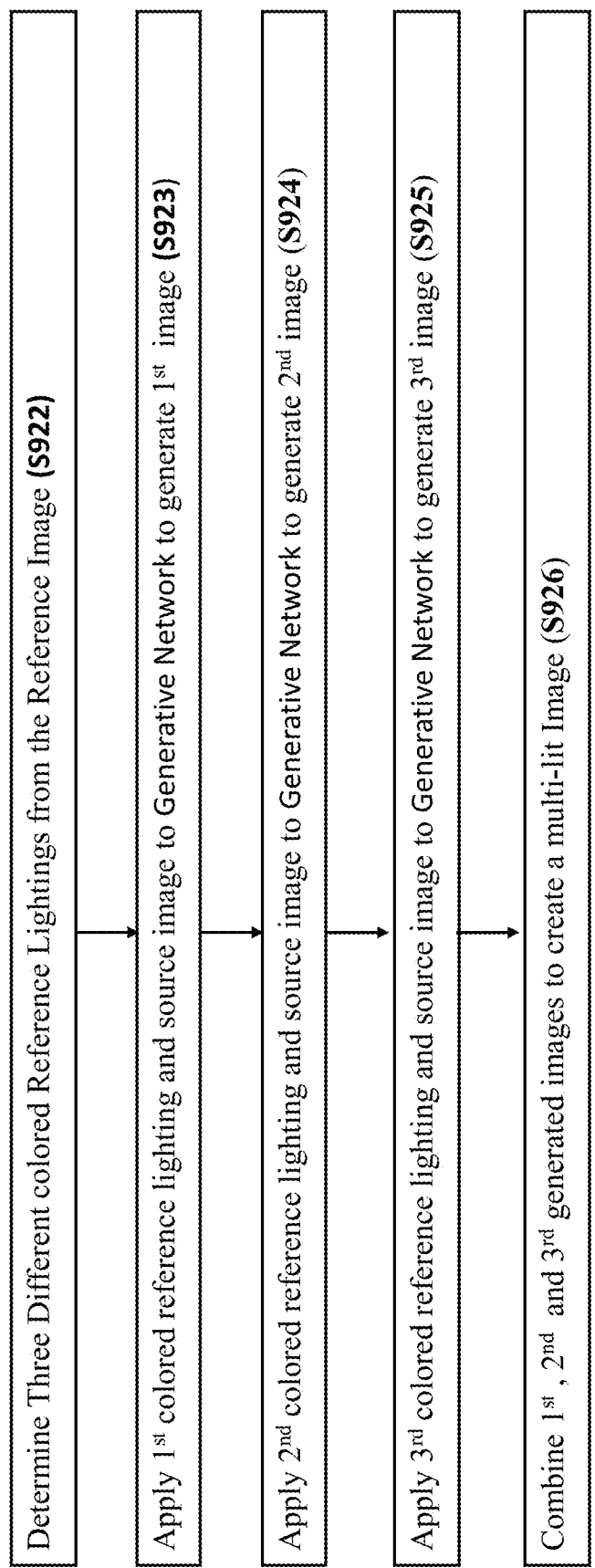
FIG. 9B illustrates a method of using the GAN to transfer multi-colored lighting from a reference image to a source image according to an exemplary embodiment of the disclosure.

FIG. 9B illustrates a method transferring tri-colored light from a reference image to a source image according to an exemplary embodiment of the disclosure.

The method of FIG. 9B includes determining three different colored reference lightings from the reference image (s922). For example, red colored lighting, green colored lighting and blue colored lighting may be derived from the reference image 119. The red colored lighting may be lighting in a red frequency range or from a red channel, the green colored lighting may be lighting in a green frequency range or from a green channel, and the blue colored lighting may be lighting in a blue frequency range or from a blue channel. For example, the reference image 119 may be applied a decomposer to extract a first grayscale image corresponding to the red channel, a second grayscale image corresponding to green channel, and a third grayscale image corresponding to the blue channel. The grayscale images may then be applied to the lighting estimator 320 to generate each of first, second, and third colored reference lightings. While red, green, and blue are provided as examples of the three colors, the inventive concept is not limited thereto, as 3 colors different from red, green, and blue may be used in alternate embodiments.

The method of FIG. 9B further includes applying the first colored reference lighting and a source image to the generative network to create a first generated image (s923). For example, the first colored reference lighting may be applied to the Encoder 331 of the generative network 330 and the source image 122 may be applied to the Attribute Mapping Network 334 of the generative network 330 to create the first generated image.

The method of FIG. 9B further includes applying the second colored reference lighting and the source image to the generative network to create a second generated image (s924). For example, the second colored reference lighting may be applied to the Encoder 331 of the generative network 330 and the source image 122 may be applied to the Attribute Mapping Network 334 of the generative network 330 to create the second generated image.

The method of FIG. 9B further includes applying the third colored reference lighting and the source image to the generative network to create a second generated image (s925). For example, the third colored reference lighting may be applied to the Encoder 331 of the generative network 330 and the source image 122 may be applied to the Attribute Mapping Network 334 of the generative network 330 to create the third generated image.

The method of FIG. 9B further includes combining the first, second, and third generated images to create a multi-lit image (s926). For example, the red (first) channel from the first generated image, the green (second) channel from the second generated image, and the blue (third) channel from the third generated image may form red, green, and blue channels for the final image (i.e., the multi-lit image). The multi-lit image is the source image 122 re-lit by the first colored reference lighting, the second colored reference lighting, and the third colored reference lighting. The above method may be adjusted when only two colored lightings are present in the reference image 119. For example, in this embodiment, step S925 may be omitted and step S926 would only combine the first and second generated images.

Figure 10:
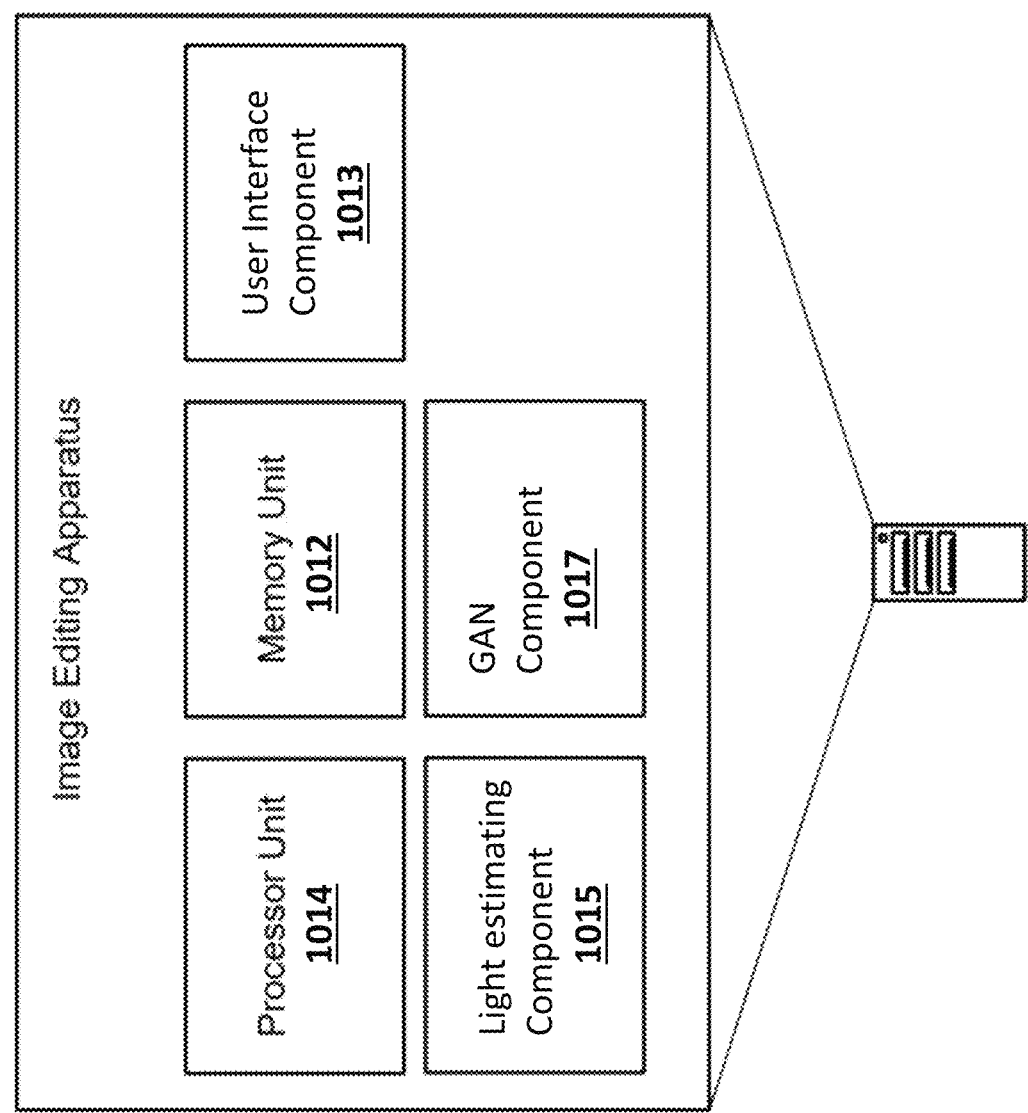
FIG. 10 illustrates an image editing apparatus used for transferring lighting from a reference image to a source image according to an exemplary embodiment of the disclosure.

FIG. 10 is an example of an image editing apparatus 1000 according to aspects of the present disclosure. According to some aspects of the present disclosure, the image editing apparatus 1000 enables a user to insert a re-light a source image based on lighting in a reference image.

In one aspect, the image editing apparatus 1000 includes a processor unit 1012 (e.g., includes one or more processors), a memory unit 1014 (e.g., a memory), a user interface component 1013, a lighting estimating component 1015, and a GAN component 1017.

According to some aspects, the user interface component 1013 is used to enter a reference image and a source image and may be implemented by the user interface 112, the lighting estimating component 1015 is used to generate reference lighting from the reference image and may be implemented by the light estimator 320, and the GAN component 1017 may be used to create a generated image from the reference lighting and the source image and may be implemented by the generative network 330. The image editing apparatus 1000 may be located entirely on the client device 110 or portions of the image editing apparatus 1000 may be located on the client device 110 and the server 130.

Figure 11:
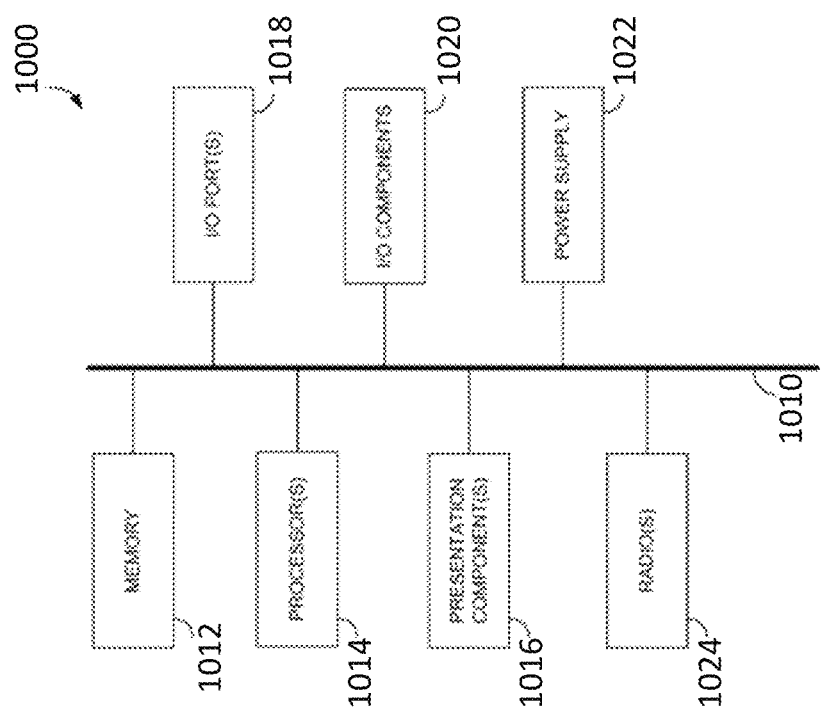
FIG. 11 illustrates an exemplary computing device used to perform one or more methods of the disclosure.

Having described implementations of the present disclosure, an exemplary operating environment in which embodiments of the present invention may be implemented is described below to provide a general context for various aspects of the present disclosure. Referring initially to FIG. 11 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). For example, one may consider a presentation component such as a display device to be an I/O component. The diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. For example, the training data and the models may be stored in the memory 1012 when the server 130 is implemented by computing device 1000. The computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as, stereoscopic camera systems, infrared camera systems, RGB camera systems, and combinations of these for gesture detection and recognition.

The present invention has been described in relation to particular embodiments, which are intended in all respects to be illustrative rather than restrictive Alternative embodiments will become apparent to those of ordinary skill in the art to which the present invention pertains without departing from its scope

What is claimed is:

1. A method for training a generative adversarial network (GAN) to transfer lighting from a reference image to a source image, the method comprising:
    receiving, by a user interface of an image editing apparatus, the source image and the reference image;
    generating, by a lighting estimator of the image editing apparatus, a lighting vector from the reference image;
    applying, by the image generating apparatus, features of the source image and the lighting vector to a generative network of the GAN to create a generated image;
    applying, by the image generating apparatus, features of the reference image and the lighting vector to a discriminative network of the GAN to update weights of the discriminative network; and
    applying, by the image generating apparatus, features of the generated image and the lighting vector to the discriminative network to update weights of the generative network.

2. The method of claim 1, further comprising updating the weights of the discriminative network based on a result of the applying of the features of the generated image and the lighting vector to the discriminative network.

3. The method of claim 1, wherein the lighting vector is 9-dimensional spherical harmonics.

4. The method of claim 1, further comprising the image editing apparatus adding non-isotropic Gaussian noise to the lighting vector prior to the applying of the features of the source image and the lighting vector to the generative network.

5. The method of claim 1, wherein the generating of the lighting vector comprises:
    applying, by the lighting estimator, features of the reference image to a deep convolutional neural network (CNN) to generate a lighting condition vector; and
    applying, by the lighting estimator, the lighting condition vector to a multilayer perceptron (MLP) to generate the lighting vector.

6. The method of claim 1, wherein the applying of the features of the source image and the lighting vector to the generative network comprises:
    encoding, by the generative network, the features of the source image to generate a face description vector;
    applying the lighting vector to a deep residual network of the generative network to generate a lighting description vector; and
    decoding, by the generative network, the face description vector and the lighting description vector to create the generated image.

7. The method of claim 6, wherein the decoding additionally uses skip data received from a result of the encoding.

8. The method of claim 1, wherein the applying of the features of the reference image and the lighting vector to the discriminative network comprises:
    encoding the reference image to generate encoded data;
    applying the lighting vector to a deep residual network;
    determining a measure from the encoded data and an output of the deep residual network; and
    updating the weights of the discriminative network based on the measure.

9. The method of claim 8, wherein the updating of the weights of the discriminative network based on the measure comprises updating the weights of the discriminative network to increase the measure when the measure is less than a threshold.

10. The method of claim 1, wherein the applying of the features of the generated image and the lighting vector to the discriminative network to update parameters of the generative network comprises:
    encoding the generated image to generate encoded data;
    applying the lighting vector to a deep residual network;
    determining a measure from the encoded data and an output of the deep residual network; and
    updating the weights of the generative network based on the measure.

11. The method of claim 10, wherein the updating of the weights of the generative network based on the measure comprises updating the weights of the generative network to increase the measure when the measure is equal or less than a threshold.

12. The method of claim 11, further comprising updating the weights of the discriminative network to decrease the measure when the measure is greater than the threshold.

13. The method of claim 10, further comprising compensating the weights of the generative network based on a difference between the source image and the generated image.

14. The method of claim 10, further comprising compensating the weights of the generative network based on a difference between the lighting vector of the reference image and a lighting vector derived from the generated image.

15. An image editing apparatus for transferring lighting from a first reference image to a first source image, the image editing apparatus comprising:
    a memory storing a generative adversarial network (GAN) trained to transfer the lighting from the first reference image to the first source image; and a processor configured to receive the first source image and the first reference image, determine a first lighting vector from the first reference image, and apply features of the first source image and the first lighting vector to a generative network of the GAN to create a generated image having the lighting of the first reference image, wherein the generative network is configured using an output provided by a discriminative network of the GAN previously trained using a second reference image, a second lighting vector determined from the second reference image, and a second source image.

16. The image editing apparatus of claim 15, the memory further comprising:

a user interface configured to enable a user to enter the first reference image and the first source image.

17. The image editing apparatus of claim 15, the memory further comprising:

a convolutional neural network (CNN) configured to receive features of the first reference image; and a multilayer perceptron (MLP) configured to generate the first lighting vector based on an output of the CNN.

18. The image editing apparatus of claim 15, wherein the processor is configured to determine first color lighting of a first color, second color lighting of a second color, and third color lighting of third color from the first reference lighting, operate the generative network on the first color lighting and features the first source image to create a first color image, operate the generative network on the second color lighting and the features of the first source image to create a second color image, operate the generative network on the third color lighting and the features of the source image to create a third color image, and combine the first color image, the second color image, and the third color image to create the generated image.

19. A method for transferring lighting from a first reference image to a first source image, the method comprising:

receiving, by a user interface of an image editing apparatus, the source image and the first reference image;

determining, by a lighting estimator of the image editing apparatus, a first lighting vector representing a lighting of the first reference image;

configuring, by the image editing apparatus, a generative network of a generative adversarial network (GAN) using an output provided by a discriminative network of the GAN previously trained using a using a second reference image, a second lighting vector determined from the second reference image, and a second source image; and applying, by the image editing apparatus, features of the first source image and the first lighting vector to the generative network to create a generated image.

20. The method of claim 19, wherein the applying of the features of the first source image and the first lighting vector to the generative network to create the generated image comprises:

applying light of a first color in the first lighting vector and the features of the first source image to the generative network to create a first image;

applying light of a second color in the first lighting vector and the features of the first source image to the generative network to create a second image;

applying light of a third color in the first lighting vector and the features of the first source image to the generative network to create a third image; and combining the first image, the second image, and the third image to create the generated image.

* * * * *